R. BARTHOLOMÄUS.
DIE STOCK.
APPLICATION FILED SEPT. 20, 1909.
979,056.  Patented Dec. 20, 1910.
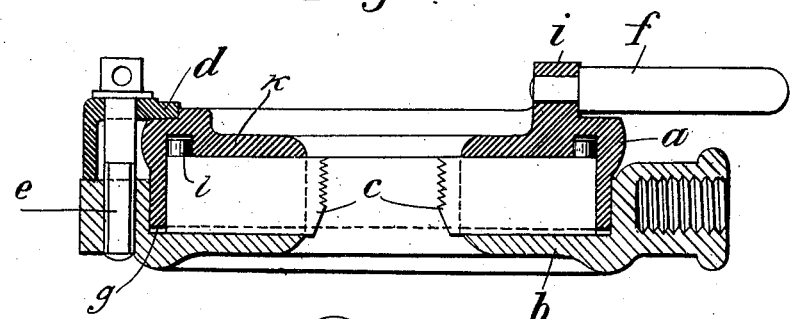
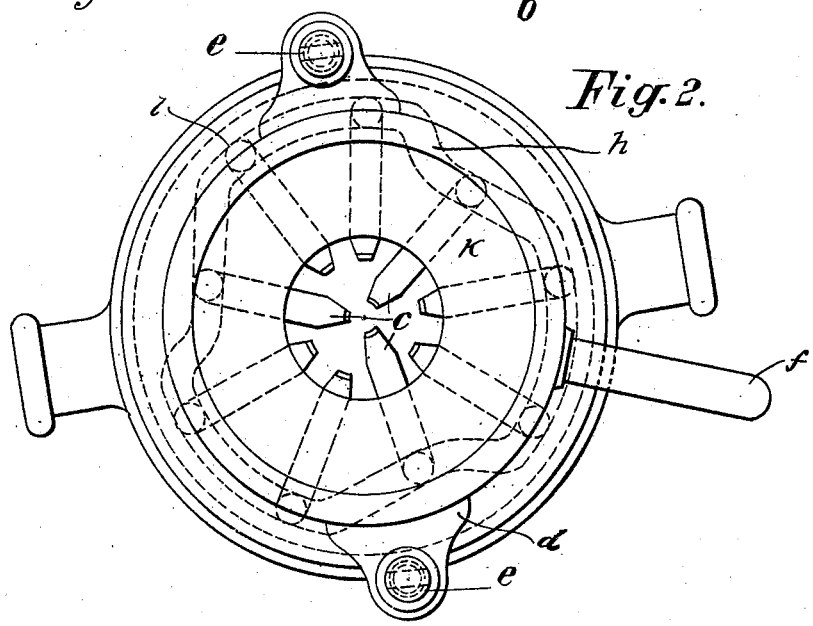
Witnesses:
M. Kindman
L. Lang
Inventor:
Rudolf Bartholomäus.
by B. Singer
Attorney.

UNITED STATES PATENT OFFICE.

RUDOLF BARTHOLOMÄUS, OF DRESDEN, GERMANY.

DIE-STOCK.

979,056.  Specification of Letters Patent.  Patented Dec. 20, 1910.

Application filed September 20, 1909. Serial No. 518,702.

*To all whom it may concern:*

Be it known that I, RUDOLF BARTHOLOMÄUS, a subject of the German Emperor, and resident of Dresden, Germany, have invented certain new and useful Improvements in and Relating to Die-Stocks, of which the following is a specification.

This invention relates to die stocks its object being to provide a device of this kind provided with several sets of screw dies which may remain continuously in the die stock, these screw dies being adapted to be alternately advanced and withdrawn toward or from the center of the stock.

In some of the known devices it is necessary to shift several rings, which requires several operations and besides, it is not possible to change all the screw dies by a turning motion extending over only one third of the periphery. In this invention the advancing and withdrawing cam grooves are interconnected so as to form an interrupted groove.

In the accompanying drawings: Figure 1 shows a cross sectional view of my improved die stock. Fig. 2 is a top plan view of same.

The die stock comprises a die carrier $b$ which is provided with lateral arms and contains several sets of shiftable screw dies $c$. A cam body $a$ is rotatably mounted on the die carrier $b$, the body being provided with an annular flange $g$ extending toward the bottom of the die carrier, and engaging the inner side of the wall of said carrier. A plurality of cam grooves $h$ identical in shape are provided in the inner face of circular top $k$ of the body, said grooves extending into each other forming thereby a contiguous groove, composed of cyclically interconnected curved portions without any interruption.

The screw dies $c$, slidably disposed in the carrier $a$, are provided with preferably circular guiding members 1 which move in grooves $h$ of the top $k$. When the cam body is rotated on the die carrier $b$ the screw dies $c$ are radially displaced on the carrier $a$. When the extreme inward position has been passed, the groove provided in part $a$ and which is engaged by the guiding members of the screw dies, draws the said screw dies again backward. The rotation of this upper part is performed by a lever $f$ which is engaged to this end into an eye $i$ of part $a$.

As may be clearly seen from Fig. 1 the flat circular top $k$ of the cam body engages the head surface of the single dies, exerting thereby a uniform pressure upon said dies and holding them in engagement with the stock carrier, while the rear part of the dies is in engagement with the flange $g$ of the cam body.

In order to prevent the upper part $a$ being rotated during the operation of screw cutting, the said part $a$ is pressed on the lower part $b$ by means of two pressure screws $e$ and knees $d$, in the manner shown in Fig. 1.

The dimensions of the members of the die stock are preferably chosen in such a manner that the tensioning screws $e$ press the upper part with its pressure surface against the surfaces of the screw dies so that the screw dies receive a rigid bearing point.

Having now fully described my said invention, what I claim and desire to secure by Letters Patent is:—

A die stock comprising in combination, a stock carrier, a plurality of sets of dies radially slidable in said carrier, a cam body rotatably secured on said carrier, said body being provided with a groove formed by a plurality of curved grooves, each of said last named grooves extending without angular interruption into the adjacent curves, said dies being provided with guiding members engaging said grooves, means for rotating said body on said carrier, said grooves in coaction with said guiding members being adapted to displace a plurality of said dies radially and to maintain other dies in their position, when said body is rotated over one third of the periphery of said carrier.

In testimony whereof I have hereunto set my hand in presence of two witnesses.

RUDOLF BARTHOLOMÄUS.

Witnesses:
   RUDOLPH FRICKE,
   SOUTHARD P. WARNER.